US012762168B2

(12) United States Patent
Samuel et al.

(10) Patent No.: US 12,762,168 B2
(45) Date of Patent: Oct. 13, 2026

(54) ENHANCED LANGUAGE MODEL FOR PROCESSING USER-SPECIFIC QUERIES

(71) Applicant: Intuit Inc., Mountain View, CA (US)

(72) Inventors: John Samuel, Bangalore (IN); Virendra Vaishnav, Bangalore (IN); Priyanka Bansal, Bangalore (IN); Sanjay Kumar, Bangalore (IN); Vivek Chandra Joshi, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/006,159

(22) Filed: Dec. 30, 2024

(65) Prior Publication Data

US 2026/0187128 A1 Jul. 2, 2026

(51) Int. Cl.

| | |
|---|---|
| ***G06F 16/335*** | (2019.01) |
| ***G06F 9/54*** | (2006.01) |
| ***H04L 51/04*** | (2022.01) |

(52) U.S. Cl.
CPC .............. *G06F 16/337* (2019.01); *G06F 9/54* (2013.01); *H04L 51/04* (2013.01)

(58) Field of Classification Search
CPC ........ G06F 16/335; G06F 9/54; G06F 16/337; H04L 51/04
USPC .......................................................... 707/722
See application file for complete search history.

(56) References Cited

U.S. PATENT DOCUMENTS

| | | | | |
|---|---|---|---|---|
| 11,184,316 | B2 * | 11/2021 | Cuciti | G06Q 10/107 |
| 2018/0330248 | A1 * | 11/2018 | Burhanuddin | G06N 7/01 |
| 2022/0222109 | A1 * | 7/2022 | Ponnusamy | G06F 9/546 |
| 2024/0386015 | A1 * | 11/2024 | Crabtree | G06F 16/9024 |

* cited by examiner

*Primary Examiner* — Kuen S Lu
(74) *Attorney, Agent, or Firm* — Lathrop GPM LLP

(57) ABSTRACT

A method including receiving a user-specific query. User data is extracted from a user-specific data source and converted into a graph data structure that defines relationships between data elements contained in the user data. The graph data structure is stored in a data schema. A prompt is constructed for a language model. Constructing includes adding, to the prompt, the graph data structure such that, when executed, the language model processes both the relationships and the data elements in the graph data structure. Constructing also includes adding, to the prompt, a first command to reference a context including context data stored in the data schema. Constructing also includes adding, to the prompt, a second command to generate an output from the context. The output is indirectly related to the user data. The language model is executed with the prompt to generate the output. The output is returned.

20 Claims, 7 Drawing Sheets

ENHANCED LANGUAGE MODEL FOR PROCESSING USER-SPECIFIC QUERIES

BACKGROUND

Language models, including large language models like CHATGPT® by Open AI, LLC, are useful tools. However, language models are subject to limitations in certain applications. For example, language models are subject to "hallucination" when performing user-specific queries. The term "hallucination" means that the language model returns an output that, to a user, is clearly wrong, nonsensical, or not the type of output that the user wants, and thus the term "hallucination" as used herein is a computer-specific term. Furthermore, it is well known that language models are inaccurate when processing complex reasoning tasks, figurative language (including certain titles of products or programs), and certain other tasks.

Therefore, a technical problem is presented. The technical problem is improving a computer and a language model such that the language model may perform user-specific queries with few or no hallucinations.

SUMMARY

One or more embodiments provide for a method. The method includes receiving a user-specific query. The method also includes extracting user data from a user-specific data source. The method also includes converting the user data into a graph data structure that defines relationships between data elements contained in the user data. The graph data structure is stored in a data schema. The method also includes constructing a prompt for a language model. Constructing includes adding, to the prompt, the graph data structure such that, when executed, the language model processes both the relationships and the data elements in the graph data structure. Constructing also includes adding, to the prompt, a first command to reference a context including context data stored in the data schema. Constructing also includes adding, to the prompt, a second command to generate an output from the context. The output is indirectly related to the user data. The method also includes executing the language model with the prompt to generate the output. The method also includes returning the output.

One or more embodiments also provide for a system. The system includes a computer processor and a data repository in communication with the computer processor. The data repository stores a user-specific query. The data repository also stores user data from a user-specific data source. The data repository also stores a graph data structure that defines relationships between data elements contained in the user data. The graph data structure is stored in a data schema. The data repository also stores a prompt, a context, and an output. The system also includes a language model executable by the computer processor. The system also includes a server controller programmed, when executed by the computer processor, to perform a computer-implemented method. The computer-implemented method includes receiving the user-specific query. The computer-implemented method also includes extracting the user data. The computer-implemented method also includes converting the user data into the graph data structure. The computer-implemented method also includes constructing the prompt. Constructing includes adding, to the prompt, the graph data structure such that, when executed, the language model processes both the relationships and the data elements in the graph data structure. Constructing also includes adding, to the prompt, a first command to reference the context including context data stored in the data schema. Constructing also includes adding, to the prompt, a second command to generate the output from the context. The output is indirectly related to the user data. The computer-implemented method also includes executing the language model with the prompt to generate the output.

One or more embodiments also provide for a method of training a language model. The method includes extracting user data from a user-specific data source. The method also includes converting the user data into a graph data structure that defines relationships between data elements contained in the user data. The graph data structure is stored in a data schema. The method also includes constructing a prompt for the language model. Constructing includes adding, to the prompt, the graph data structure such that, when executed, the language model processes both the relationships and the data elements in the graph data structure. Constructing also includes adding, to the prompt, a first command to reference a context including context data stored in the data schema. Constructing also includes adding, to the prompt, a second command to generate an output from the context. The output is indirectly related to the user data. The method also includes executing the language model with the prompt to generate the output. The method also includes returning the output to a data repository also storing training data. The method also includes retraining the language model on the output and the training data.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

Figure 1A:
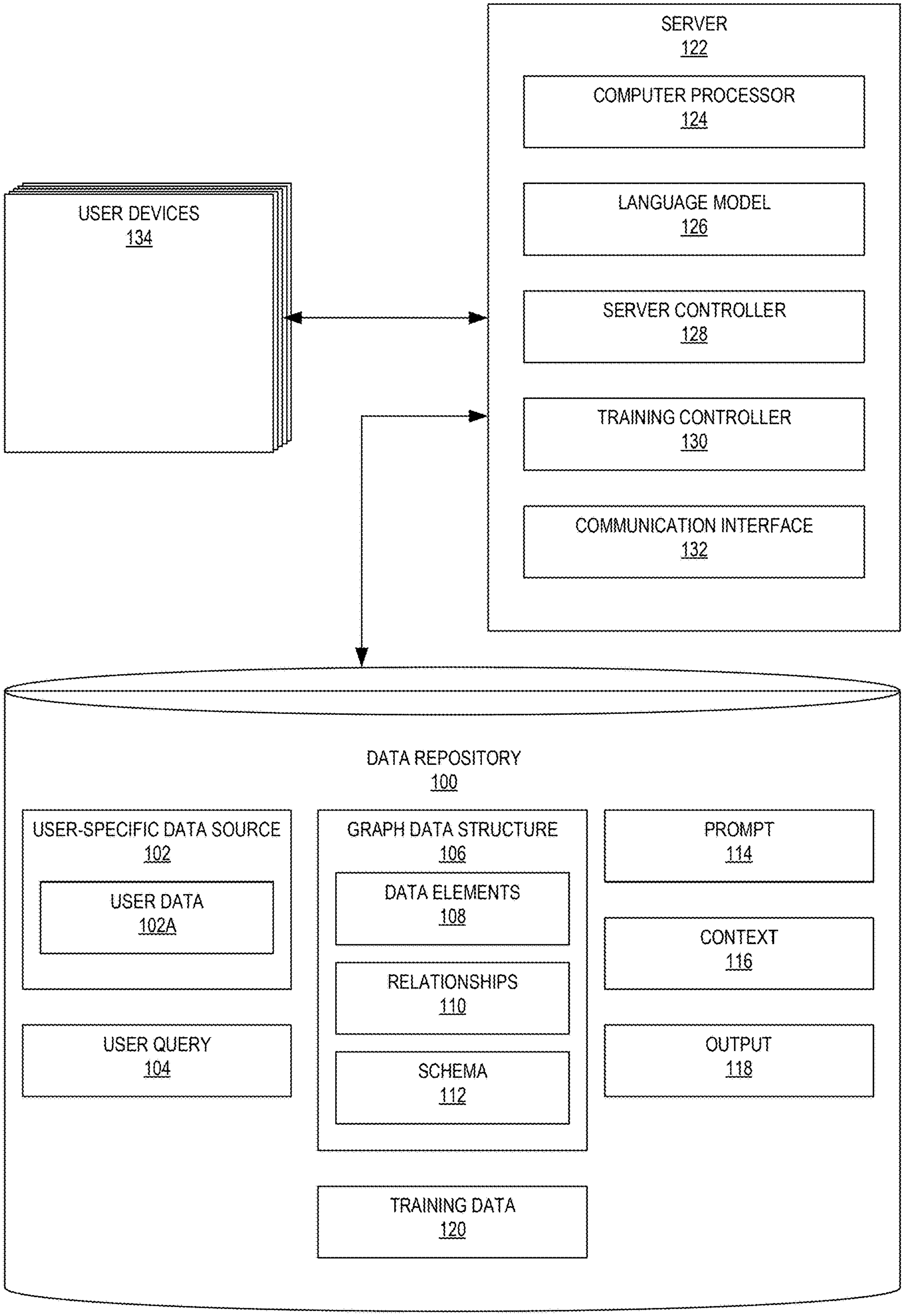
FIG. 1A and FIG. 1B show a computing system, in accordance with one or more embodiments.

One or more embodiments are directed to solving the technical problem of improving a computer and a language model such that a language model may perform user-specific queries with few or no hallucinations. One or more embodiments solve the technical problem by improving the language model by improving the prompt used to command and control the language model. In addition, the language model may be trained, or retrained, to enhance or further enhance the language model against undesirable hallucination.

In general, when a user-specific query is received, user data is extracted from a user-specific data source. The user data is specific to the user. For example, assume the user-specific query relates to predicting, with a language model, which tax software application best suits a user's specific tax preparation requirements from among many tax preparation software applications. In this case, the user-specific data may be extracted from tax documents submitted by the user (e.g., an electronic W-2 form, an electronic 1099 form, etc.).

Note that one or more embodiments are applicable to enhancing language models to perform user-specific queries with reduced hallucination. Thus, the tax example mentioned above, and continued below, is provided only to illustrate one specific example of how one or more embodiments may be implemented. One or more embodiments are not directed to preparing taxes or any other financial activity, but rather are directed to how the language model may be enhanced with respect to many different language model applications.

Continuing a general description of one or more embodiments, once the user-specific data is extracted, the user-specific data is converted into a graph data structure. As used herein, a graph data structure is a data structure that defines data elements (within the user-specific data) and relationships between data elements. In addition, the user-specific data is formatted using a preselected data schema. A data schema is a predefined organization of data within a data structure which defines the structure and relationships between different data elements, as well as constraints on the data. The data schema may, in an embodiment, define the graph data structure in that the schema formats the data elements and specifies the relationship among the data elements. Thus, the user-specific data is organized in a predetermined manner into a predetermined data structure. In this manner, the behavior of the language model, as described in more detail below, may be better controlled.

Continuing the example above, the user-specific tax data is converted into a graph database. For example, or in addition, the user-specific tax data is converted into a predetermined data schema. In a particular example, the user-specific tax data may be stored according to an "Intelligent system for Data eXchange" (IDX) schema or according to a JAVASCRIPT® (by Oracle, Inc.) object notation (JSON) schema.

Next, a prompt is constructed for the language model. A prompt is alphanumeric text that instructs a language model to generate a desired output. In the case of one or more embodiments, the prompt includes the graph data structure (or a reference to the graph data structure), a command to reference a context, and a command to generate an output from the context that is indirectly related to the context. The context is a predetermined data source, which may be stored according to the data schema designated for the graph data structure.

Continuing the example above, a prompt is generated. The prompt adds (or references) the graph data structure containing the user-specific tax data. The prompt also instructs the language model to reference a context that contains different tax software applications and descriptions of the specifications and capabilities of each of the different tax software applications. The context is in the same data schema as the user-specific tax data. The prompt also instructs the language model to generate a recommendation regarding which of the different tax software applications is most applicable to the user-specific data. Next, a processor executes the language model with the prompt. As a result, the language model generates an output. The output is then returned.

Continuing the above example, a processor executes the prompt described above. The output is a recommendation that "Tax Software Alpha" is most applicable for processing the user-specific data. In the example, returning the output includes displaying the recommendation on a display screen. However, returning the output could include selecting the recommended tax software application and then executing the tax software application on the user-specific data.

In summary, when a user-specific query is received, user-specific data is extracted and converted into a graph data structure having a predetermined data schema. A prompt is constructed that includes, or references, the graph data structure, a reference to a context, and a command to reference the context stored in the same data schema. The language model is then executed with the prompt, and the output is returned.

One or more embodiments may reduce the incidence of hallucination by the language model. Hallucination is reduced because the language model is constrained to use certain information (i.e., the user-specific data and the context). Additionally, the operation of the language model is further improved because the data schema and the context reduces the likelihood that the language model will misinterpret or misunderstand instructions or complex terms.

In addition to the above, the language model may be further improved by training (or retraining) the language model on the context. Additional retraining may be performed using additional training data including the user-specific data and corresponding correct (or incorrect) outputs that are received with respect to the user-specific queries, possibly together with the context. In this manner, the language model may be further improved with respect to reducing hallucinations.

Thus, one or more embodiments provide a technical solution, described above and further below, to the technical problem of improving a computer and a language model such that a language model may perform user-specific queries with few or no hallucinations. Attention is now turned to the figures.

FIG. 1A shows a computing system, in accordance with one or more embodiments. The system shown in FIG. 1A includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) includes, or receives data from, a user-specific data source (102). The user-specific data source (102) is a data source that stores user data (102A) that is specific to a particular user query (104), defined below. The user-specific data source (102) may be, for example, data received from a user, data that pertains to the user and is stored in a data repository (either local to the data repository (100) or external to the data repository (100)), a database, a memory, etc. However, the user-specific data source (102) nevertheless contains the user data (102A) that is specific to the user.

The user data (102A) is data that pertains specifically to a user related to the user query (104), defined below. The user data (102A) may be, for example, electronic forms, electronic documents, image files, data structures, etc. However, the user data (102A) pertains specifically to the user to whom the user query (104) is related.

The user query (104) is a query that pertains to the user described by or referred to by the user data (102A). The user query (104) may, or may not, be submitted by the user in question. For example, the user query (104) may be submitted by an automated process managed by a third-party. Alternatively, the user query (104) may be submitted by the user via one of the user devices (134) described below.

The user query (104) may be explicit or implicit. An explicit query is a query that specifically requests that information be retrieved, collated, summarized, or analyzed from (or using) the user data (102A). An implicit query is a query that is triggered by an automated process. For example, the user query (104) is an implicit query when a server controller (128) automatically determines, in response to receiving the user data (102A), a recommended software application to display on one of the user devices (134).

Nevertheless, the user query (104) pertains to the specific user two whom the user data (102A) pertains. The user query (104) may take the form of a text query, may be a prompt for a language model, or may take another form.

The data repository (100) also stores a graph data structure (106). As used herein, the graph data structure (106) is a data structure that defines data elements (within the user-specific data) and relationships (110) between data elements. Thus, the graph data structure (106) may be interpreted more broadly than some kinds of graph data structures that are defined by nodes and edges. For example, the graph data structure (106) may be defined by a schema (e.g., the schema (112)) that formats data elements and the relationships (110) among the data elements. However, the graph data structure (106) may be a data structure that defines data elements as nodes and the relationships (110) among the data elements as edges.

The data elements (108) are individual subsets of data that represent some stated fact contained in the user data (102A). For example, a field, a value for a field, a cell in a table, a value for a cell in a table, a data structure element, etc., are examples of the data elements (108) in that the examples represent some stated fact contained in the user data (102A).

The relationships (110) represent quantitatively defined relationships between the data elements (108) of the user data (102A). For example, a value of a field and the field itself may have a defined relationship in that the values are associated with the specific field and represent a value of the field. The relationships (110) may, or may not, be explicitly contained in the user data (102A). When the relationships (110) are not predefined in the user data (102A), then the relationships (110) may be determined and then expressed explicitly in the graph data structure (106).

In addition, the graph data structure (106) that contains the user data (102A) is formatted using a preselected data schema (112). The schema (112) is a predefined organization of data within a data structure. The predefined organization defines the graph data structure (106) and the relationships (110) between different data elements (108), as well as constraints on the data contained in the graph data structure (106). The schema (112) may, in an embodiment, define the graph data structure (106) in that the schema formats the data elements (108) and specifies the relationship (110) among the data elements (108). Thus, the user data (102A) is organized in a predetermined manner into a predetermined data structure. In this manner, the behavior of the language model, as described in more detail with respect to FIG. 2, may be better controlled.

The data repository (100) also stores a prompt (114). The prompt (114) is alphanumeric text that instructs a language model (126) to generate a desired output. The prompt (114) may include instructions, context (116), system messages (i.e., general guidelines to the language model regarding how the language model should process the prompt (114)), data references, data structures, etc. In the case of one or more embodiments, the prompt (114) includes the graph data structure (or a reference to the graph data structure), a command to reference a context (116), and a command to generate an output from the context (116) that is indirectly related to the context (116). "Indirectly related" means that the context (116) contains at least some information or data that is different in kind or type than the user data (102A).

The data repository (100) also stores a context (116). The context (116) is a predetermined data source. The predetermined data source may be stored according to the schema (112) designated for the graph data structure. The context (116) may be stored in the data repository (100), or may be stored externally from the relationships (110), but accessed by the server (122). An example of the context (116) may be information describing various tax preparation software applications which may be applied to the user data (102A) when the user data (102A) is tax data. Another example of the context (116) may be a specific knowledge base, such as a set of rules, policies, and information that are related to the user data (102A).

As indicated above, the context (116) is indirectly related to the user data (102A). Thus, the context (116) contains at least some information or data that is different in kind or type than the user data (102A). As an example, as indicated above, if the user data (102A) is tax data regarding a user, then the context (116) may be information describing tax preparation software applications. The information describing the software application is different in kind than the user data (102A), yet is still related to the user data (102A).

The data repository (100) also stores an output (118). The output (118) is the output generated by the language model (126), defined below. Thus, the output (118) takes the form of alphanumeric text. Examples of the output (118) are shown with respect to FIG. 3 through FIG. 5.

The data repository (100) also stores training data (120). The training data (120) is data which may be used to train the language model (126) according to the procedure shown in FIG. 1B. The training data (120) may include language data, various instances of the user data (102A) for various users, one or more queries like the user query (104), one or more prompts like the prompt (114), one or more sets of context like the context (116), one or more instances of output like the output (118), one or more graph data structures like the graph data structure (106), and combinations thereof.

The system shown in FIG. 1A may include other components. For example, the system shown in FIG. 1A also may include a server (122). The server (122) is one or more computer processors, data repositories, communication devices, and supporting hardware and software. The server (122) may be in a distributed computing environment. The server (122) is configured to execute one or more applications, such as the language model (126), the server controller (128), or the training controller (130). An example of a computer system and network that may form the server (122) is described with respect to FIG. 6A and FIG. 6B.

The server (122) includes a computer processor (124). The computer processor (124) is one or more hardware or virtual processors which may execute computer readable program code that defines one or more applications, such as the language model (126), the server controller (128), or the training controller (130). An example of the computer processor (124) is described with respect to the computer processor(s) (602) of FIG. 6A.

The server (122) also includes a language model (126). The language model (126) is a natural language processing machine learning model. An example of the language model (126) may be a large language model, such as CHATGPT® by OpenAI, LLC or GenOS. However, different language models may be used. Use of the language model (126) is described with respect to FIG. 2.

More specifically, the language model may include several layers. The language model includes an input layer programmed to process the user data in the data schema. The language model includes a feature extraction layer programmed to extract a feature from the user data and prepare the feature for further processing. The language model includes a retrieval layer programmed to retrieve data from the graph data structure. The language model includes a classifier layer including a neural network programmed to categorize the feature and the user data and to predict, from the feature and the user data, the output.

The neural network may operate using one or more layers of weights. The layers of weights may be sequentially applied to sets of input data, which may be referred to as input vectors. For each layer of the neural network, the weights of the layer may be multiplied by the input vector to generate a collection of products, which may then be summed to generate an output for the layer that may be fed, as input data, to a next layer within the neural network. The output of the neural network may be the output generated from the last layer within the neural network. Multiple neural networks may operate sequentially or in parallel. The output may be a vector or scalar value. The layers within the neural network may be different and correspond to different types of models. As an example, the layers may include layers for recurrent neural networks, convolutional neural networks, transformer models, attention layers, perceptron models, etc. Perceptron models may include one or more fully connected (also referred to as linear) layers that may convert between the different dimensions used by the inputs and the outputs of a model. Different types of machine learning algorithms may be used, including regression, decision trees, random forests, support vector machines, clustering, classifiers, principal component analysis, gradient boosting, etc.

The neural networks may be trained by inputting training data to a neural network to generate training outputs that are compared to expected outputs. For supervised training, the expected outputs may be labels associated with a given input. For unsupervised learning, the expected outputs may be previous outputs from the neural network. The difference between the training output and the expected output may be processed with a loss function to identify updates to the weights of the layers of the model. After training on a batch of inputs, the updates identified by the loss function may be applied to the neural network to generate a trained neural network. Different algorithms may be used to calculate and apply the updates to the neural network, including back propagation, gradient descent, etc.

The server (122) also may include a server controller (128). The server controller (128) is software or application specific hardware which, when executed by the computer processor (124), controls and coordinates operation of the software or application specific hardware described herein. Thus, the server controller (128) may control and coordinate execution of the language model (126), the server controller (128), the training controller (130), or the communication interface (132). The server controller (128) may implement the method of FIG. 2.

The server (122) also may include a training controller (130). The training controller (130) is software or application specific hardware which, when executed by the computer processor (124), trains one or more machine learning models (e.g., the language model (126)). The training controller (130) is described in more detail with respect to FIG. 1B.

The server (122) also may include a communication interface (132). The communication interface (132) is hardware or software which permits communication between the server (122) and the user devices (134). Details of the communication interface (132) are described to the communication interface (608) described with respect to FIG. 6A.

The system shown in FIG. 1A also may include one or more user devices (134). The user devices (134) may be considered remote or local. A remote user device is a device operated by a third-party (e.g., an end user of a chatbot) that does not control or operate the system of FIG. 1A. Similarly, the organization that controls the other elements of the system of FIG. 1A may not control or operate the remote user device. Thus, a remote user device may not be considered part of the system of FIG. 1A.

In contrast, a local user device is a device operated under the control of the organization that controls the other components of the system of FIG. 1A. Thus, a local user device may be considered part of the system of FIG. 1A.

Figure 6A:
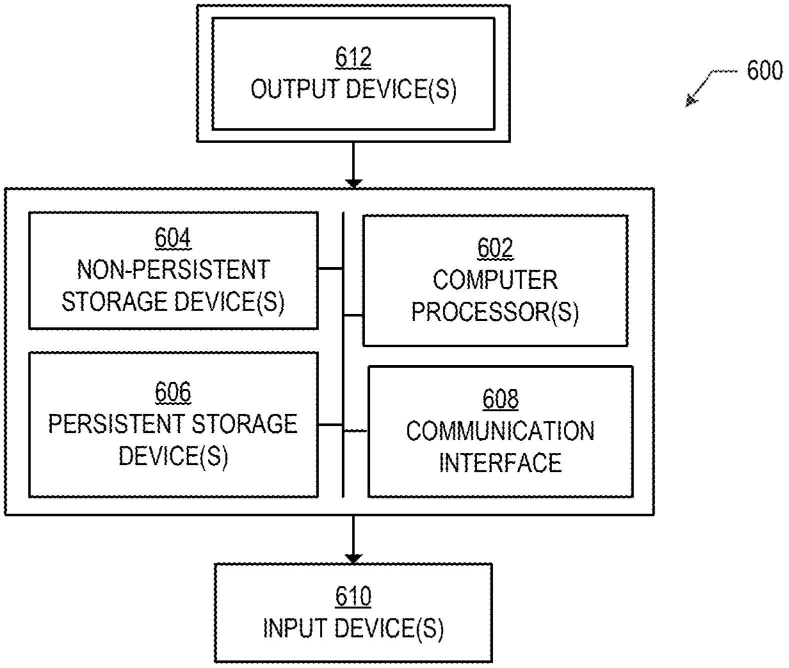
FIG. 6A and FIG. 6B show a computing system and network environment, in accordance with one or more embodiments.

In any case, the user devices (134) are computing systems (e.g., the computing system (600) shown in FIG. 6A) that communicate with the server (122). In another embodiment, one or more of the user devices (134) may be operated by a computer technician that services the various components of the system shown in FIG. 1A.

Figure 1B:
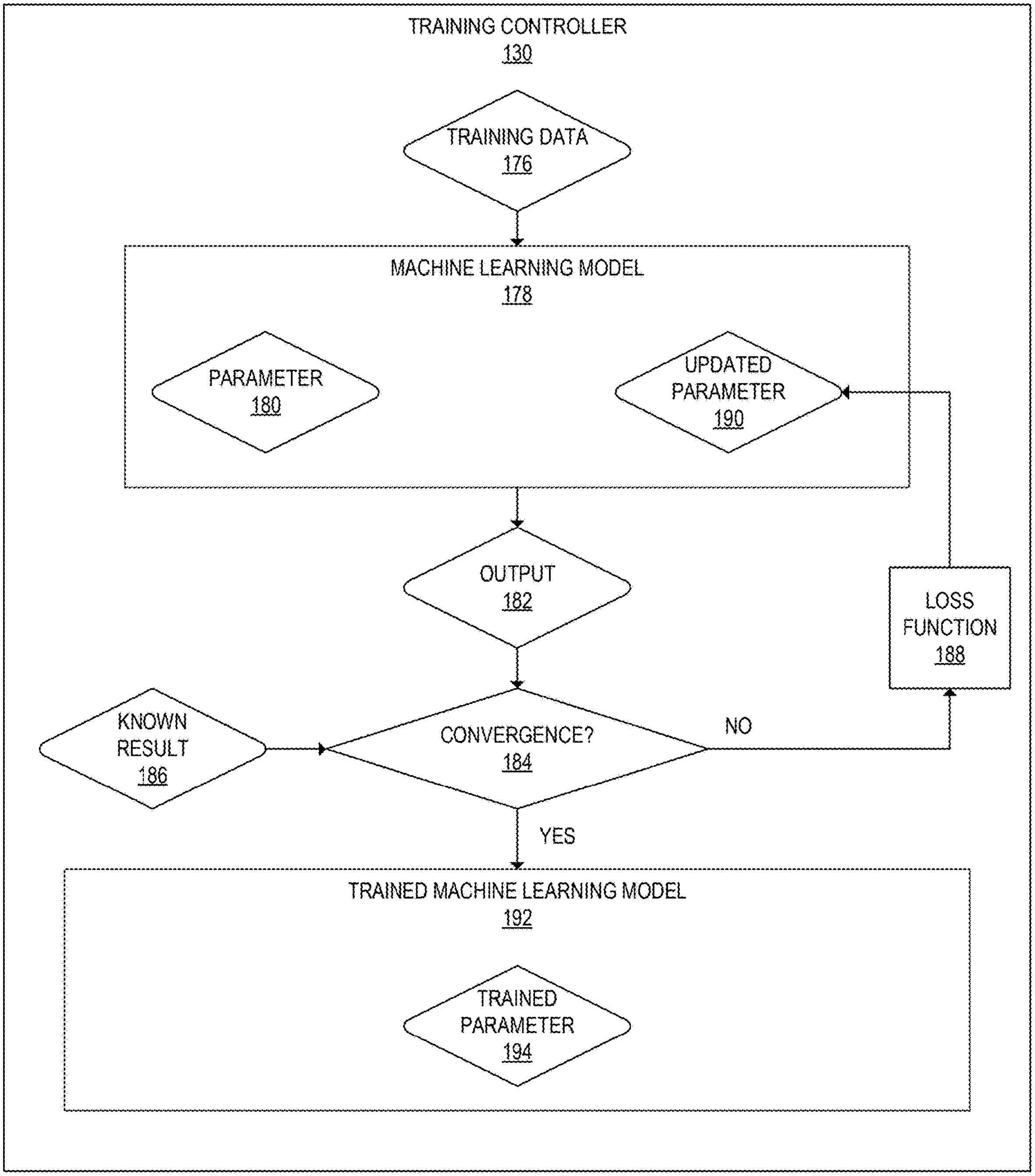

Attention is turned to FIG. 1B, which shows the details of the training controller (130). The training controller (130) is a training algorithm, implemented as software or application specific hardware, that may be used to train one or more of the machine learning models described with respect to the computing system of FIG. 1A.

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model is applied to unknown data (i.e., data for which the actual result is not known) in order to make predictions.

Some machine learning models may be applied to vector data structures. A vector is a computer readable data structure. A vector may take the form of a matrix, an array, a graph, or some other data structure. However, a frequently used vector form is a one by N matrix, where each cell of the matrix represents the value for one feature. As described above, a feature is a topic of data (e.g., a color of an object, the presence of a word or alphanumeric text, a physical measurement type, etc.). A value is a numerical or other recorded specification of the feature. For example, if the feature is the word "cat," and the word "cat" is present in a corpus of text, then the value of the feature may be "1" (to indicate a presence of the feature in the corpus of text).

In one or more embodiments, some of the data in the data repository (100) of FIG. 1A may be stored in the form of one or more vectors. For example, the training data (120) may be expressed as one or more vectors. Similarly, the user data (102A), the user query (104), the graph data structure (106), the prompt (114), the context (116), and the output (118) may be converted from natural language into vectors as part of training the language model (126).

Returning to the operation of the training controller (138), training starts with training data (176), which may be expressed in vector form. The training data (176) may be the training data (120) from FIG. 1A, expressed in vector form.

The training data may be labeled. The labels represent a known result. Thus, a label applied to an instance of the output (118) may be "correct" or "incorrect" (i.e., for a prior application of the language model (126), the output (118) was evaluated to be correct or incorrect).

Thus, the training data (176) may be data for which the final result is known with certainty. If the prediction does not match the label, then the weights of the layers in the machine learning model (178) (e.g., the language model (126) of FIG. 1A) may be updated and the training process iterated.

More generally, the training data (176) is provided as input to the machine learning model (178), which may be the language model (126) of FIG. 1A. The machine learning model (178) may be characterized as a program that has adjustable parameters. The program is capable of learning and recognizing patterns to make predictions. The output of the machine learning model (178) may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

One or more initial values are set for the parameter (180). The machine learning model (178) is then executed on the training data (176). The result is an output (182), which is a prediction, a classification, a value, or some other output which the machine learning model (178) has been programmed to output.

The output (182) is provided to a convergence process (184). The convergence process (184) is programmed to achieve convergence during the training process. Convergence is a state of the training process, described below, in which a predetermined end condition of training has been reached. The predetermined end condition may vary based on the type of machine learning model (178) being used (supervised versus unsupervised machine learning), or may be predetermined by a user (e.g., convergence occurs after a set number of training iterations, described below).

In the case of supervised machine learning, the convergence process (184) compares the output (182) to a known result (186). The known result (186) is stored in the form of labels for the training data (176). For example, the known result (186) for a particular entry in an output (182) vector of the machine learning model (178) may be a known value, and that known value is a label that is associated with the training data (176).

Continuing the example of supervised machine learning model training, a determination is made whether the output (182) matches the known result (186) to a predetermined degree. The predetermined degree may be an exact match, a match to within a prespecified percentage, or some other metric for evaluating how closely the output (182) matches the known result (186). Convergence may occur when the known result (186) matches the output (182) to within a prespecified percentage. When many predictions are involved, then convergence may occur when more than a threshold number of predictions correctly match the corresponding labels.

For example, the threshold may be 95%. In this case, when the accuracy of the machine learning model (178) reaches 95% (representing that in 95 times out of 100 query predictions the machine learning model (178) correctly predicted an output) then convergence occurs.

In the case of unsupervised machine learning, the convergence process (184) may be compared to the output (182) or to a prior output in order to determine a degree to which the current output changed relative to the immediately prior output or to the original output. Once the degree of change fails to satisfy the threshold degree of change, then the machine learning model may be considered to have achieved convergence. Alternatively, an unsupervised model may determine pseudo labels to be applied to the training data and then achieve convergence as described above for a supervised machine learning model. Other machine learning training processes exist, but the result of the training process may be convergence.

If convergence has not occurred (a "no" at the convergence process (184)), then a loss function (188) is generated. The loss function (188) is a program which adjusts the parameter (180) (one or more weights, settings, etc.) in order to generate an updated parameter (190). The basis for performing the adjustment is defined by the program that makes up the loss function (188). The program may be an algorithm which attempts to guess how the parameter (180) may be changed so that the next execution of the machine learning model (178), using the training data (176) with the updated parameter (190), will have an output (182) that is more likely to result in convergence. In this manner, the next execution of the machine learning model (178) is more likely to match the known result (186) (supervised learning), or which is more likely to result in an output (182) that more closely approximates the prior output (one unsupervised learning technique), or which otherwise is more likely to result in convergence.

In any case, the loss function (188) is used to specify the updated parameter (190). As indicated, the machine learning model (178) is executed again on the training data (176), this time with the updated parameter (190). The process of execution of the machine learning model (178), execution of the convergence process (184), and the execution of the loss function (188) continues to iterate until convergence.

Upon convergence (a "yes" result at the convergence process (184)), the machine learning model (178) is deemed to be a trained machine learning model (192). The trained machine learning model (192) has a final parameter, represented by the trained parameter (194). Again, the trained parameter (194) shown in FIG. 1B may be multiple parameters, weights, settings, etc.

During deployment, the trained machine learning model (192) with the trained parameter (194) is executed again, but this time on unknown data (which may be in the form of an unknown data vector) for which the final result is not known. The output of the trained machine learning model (192) is then treated as a prediction of the information of interest relative to the unknown data.

While FIG. 1A and FIG. 1B show a configuration of components, other configurations may be used without departing from the scope of one or more embodiments. For example, various components may be combined to create a single component. As another example, the functionality performed by a single component may be performed by two or more components.

Figure 2:
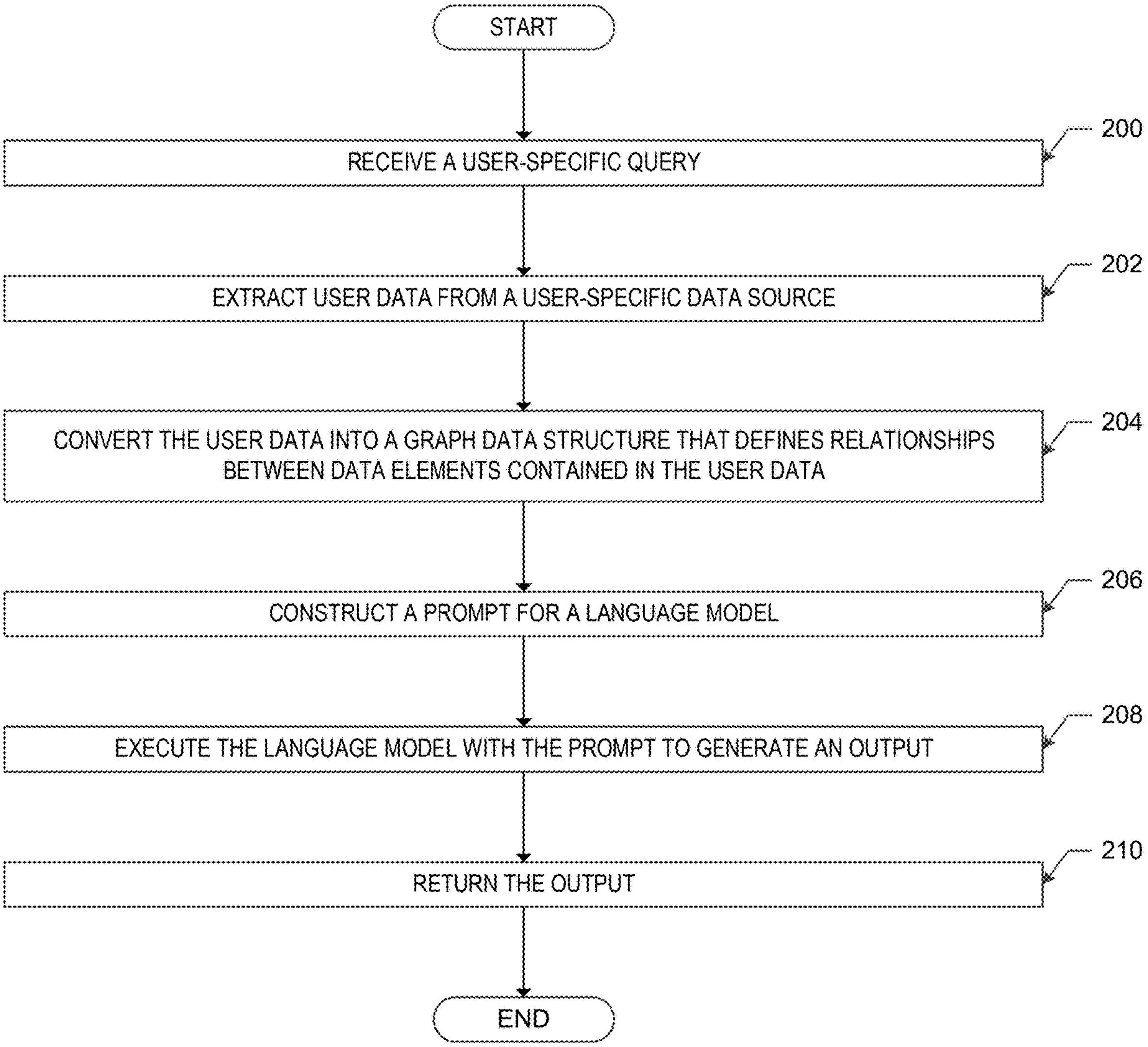
FIG. 2 shows a flowchart of a method for processing user-specific queries with an enhanced language model, in accordance with one or more embodiments.

FIG. 2 shows a flowchart of a method for processing user-specific queries with an enhanced language model, in accordance with one or more embodiments. The method of FIG. 2 may be performed using the system shown in FIG. 1A.

Step 200 includes receiving a user-specific query. The user-specific query may be received from one or more user devices, from an automated process executing on a server, or from some external device that calls the method of FIG. 2 as a service. The user-specific query may be received via a communication interface.

Step 202 includes extracting user data from a user-specific data source. The user data may be extracted by a variety of techniques, some of which may depend on the nature of the user data being extracted. For example, the user data may be portable document files (PDFs) or images containing text, in which case optical character recognition (OCR) may be performed to extract the user data. In another example, extracting the user data includes executing a multimodal machine learning model on one or more documents or images contained on the user data. In this case, a multimodal output of the multimodal machine learning model may be the user data. In still another example, a language model may be prompted to summarize the data contained in the user-specific data source, and the resulting summarized output may be the extracted user data. In another example, the user data may be copied directly from the user-specific data source. Note that copying data is still considered extracting the data (whether the data is pulled or pushed from the user-specific data source). Still other techniques for extracting user data are contemplated.

Step 204 includes converting the user data into a graph data structure that defines relationships between data elements contained in the user data. The graph data structure is stored in a data schema.

The user data may be converted by using a data conversion algorithm, such as a compiler or some other program, to convert the user data into the schema. When the schema itself defines the data elements and the relationships between the data elements, then the graph data structure (as defined above) is considered formed and step 204 is completed. However, if a graph data structure including nodes and edges is desirable, then an additional (or concurrent) conversion may be performed to change the user data from the initial data structure(s) into a data structure in which the user data is defined as the nodes and edges.

In an embodiment, the user data may be converted from the format in which the user data is initially available into an IDX data schema or a JSON schema. The user data is stored in the same data schema in which the information in the context is stored.

In another embodiment, converting includes identifying undesirable information in the first text and the second text. Then, the undesirable information is removed prior to constructing the prompt. Thus, converting may include preprocessing the data to remove or add information.

In still another embodiment, converting the user data may include converting the graph data structure into a vector. In this case, the vector is added to the prompt at step 206.

Step 206 includes constructing a prompt for a language model. Constructing the prompt includes adding commands or information to the prompt such that, when executed, the language model processes both the relationships and the data elements in the graph data structure.

Constructing includes adding, to the prompt, the graph data structure. The term "adding the prompt to the graph data structure" automatically contemplates adding to the prompt a reference to the graph data structure. Thus, the prompt includes either the graph data structure or a reference to the graph data structure.

Constructing also includes adding, to the prompt, a command to reference a context including context data stored in the data schema. Constructing also includes adding, to the prompt, a command to generate an output from the context. The output is indirectly related to the user data. Thus, the prompt includes the graph data structure (or a reference thereto), a command to reference the context, and a command to generate an output from the context.

Constructing the prompt also may include retrieving a prompt template from among a variety of prompt templates stored in a data repository. The elements of the prompt enumerated above and below then may be added to predetermined blocks or sections of the prompt template.

An example of generating a prompt may be as follows. A prompt template is received from a library of prompt templates stored in a data repository. The prompt template is tailored for use with respect to the embodiment in question. Here, the embodiment is generating a recommendation of a tax software application that is best suited to process the user's tax data. Thus, the prompt may include the following commands:

"You are an expert computer scientist familiar with the tax preparation software described in the context. Consider the user data referenced in the following graph data structure [insert graph data structure or reference to graph data structure]. You must provide your answer from the context. In view of the user data, which tax preparation software application is best able to process the user's taxes?"

Step 208 includes executing the language model with the prompt to generate the output. Executing the language model may be performed by instructing the language model to execute on the prompt or with the prompt. A processor then executes the algorithm that defines the language model. The result of execution is the output. Continuing the above example from Step 208, the output may be "Software ABC is the best software to process the user data."

The language model may be trained with the context, in order to enhance the language model. Because the context is defined in the same schema that is to define the user data, when the language model is trained on training data in the defined schema, the language model is less likely to misinterpret relationships between data in the context and the user data (which uses the same schema). In other words, the language model is enhanced because the language model is less likely to generate incorrect conclusions due to the fact that the language model is trained to recognize patterns within a predetermined schema that is applied both to the context and to the user data to which the language model compares the context.

Step 210 includes returning the output. Returning the output may take different forms, depending on the application selected for the method of FIG. 2. Broadly, returning the output means performing a practical action with the output, such as displaying the output, storing the output, passing the output to some other computer process, etc.

In a specific example, the user data is form data stored in an electronic form. In this case, the relationships are between fields in the electronic form and entries in the electronic form. The relationships are edges of the graph data structure. The data elements are names of the fields and the entries in the fields. The data elements include nodes of the graph data structure. The context, in this example, is information related to the electronic form and additional information unrelated to the form. In this case, the output is an object in the additional information pertinent to the user data. Accordingly, returning the output includes transmitting or displaying the output to a user of the user data.

The example may be extended. For example, the method also may include receiving feedback from the user regarding the output. A user profile of the user is updated based on the feedback. Then, the steps of converting, constructing, executing, and returning are repeated. The user profile is added to the user data during the repeating step. In this manner, a feedback loop is created that increases the accuracy of the language model at each iteration, because the language model has both more information in total and additional specific information about the user.

In another embodiment of returning the output, the output includes passing the output to an external program. In this case, returning the output includes processing the output by the external program. For example, if the output is a recommendation for a tax preparation software application, the user data may be returned to such application. The tax preparation software application then begins to prepare the user's taxes based on the user data.

In yet another embodiment of returning the output at step 210, the user data may be chatbot text including first text entered in the chatbot by a first user and second text entered in the chatbot by a second user. In this case, the data elements include the first text, the second text, and additional data relating to the first user. The data elements include nodes of the graph data structure. The relationships include relationships among the first text, the second text, and the additional data. The relationships include edges of the graph data structure. The context includes related information related to the first user or the second user. The output is an electronic message addressed to the first user. Thus, returning the output at step 210 includes transmitting the output to an application programming interface (API) of the chatbot. Then, returning the output includes communicating the electronic message via the API to messaging software. Returning the output then further includes transmitting the electronic message via the messaging software. Returning the output then further includes transmitting the electronic message to both the first user and the second user.

In still another example of returning the output at step 210, the user data includes first voice data from a first user and second voice data from a second user. In this case, converting the user data further includes converting the first voice data into first text and converting the second voice data into second text. Converting the data also includes separating the first text from the second text and placing the first text and the second text into a structured format. The data elements include the first text in the structured format, the second text in the structured format, and additional data relating to the first user, and the data elements are nodes of the graph data structure. The relationships include relationships among the first text, the second text, and the additional data, and the relationships are edges of the graph data structure. The context includes related information related to the first user or the second user. The output includes a summarized problem proposed by the first user and a proposed solution for presentation by the second user. Thus, returning the output, in this example, includes presenting the summarized problem and the proposed solution to one or both of the users.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

Figure 3:
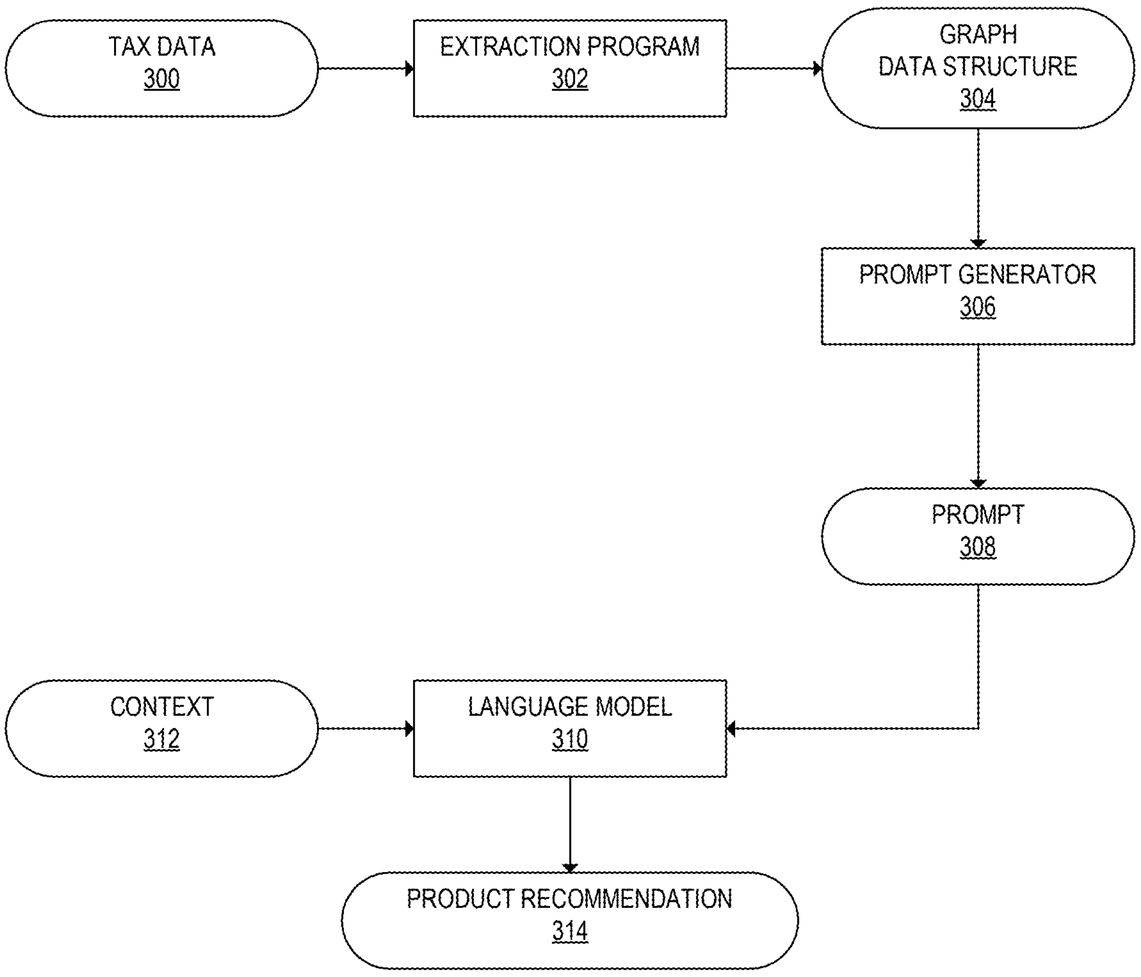
FIG. 3, FIG. 4, and FIG. 5 show data flows for example methods for processing user-specific queries with an enhanced language model, in accordance with one or more embodiments.
Figure 4:
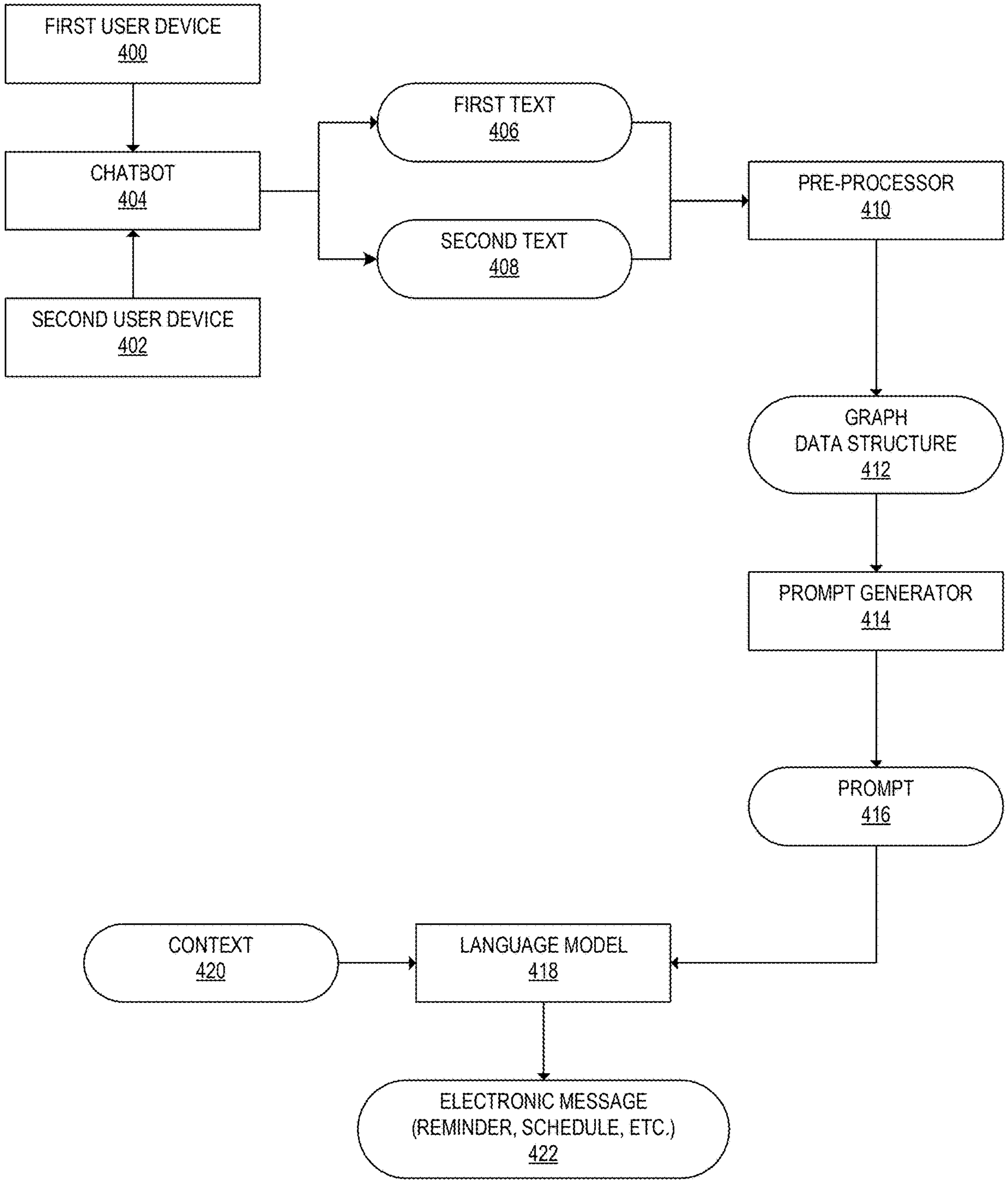
Figure 5:
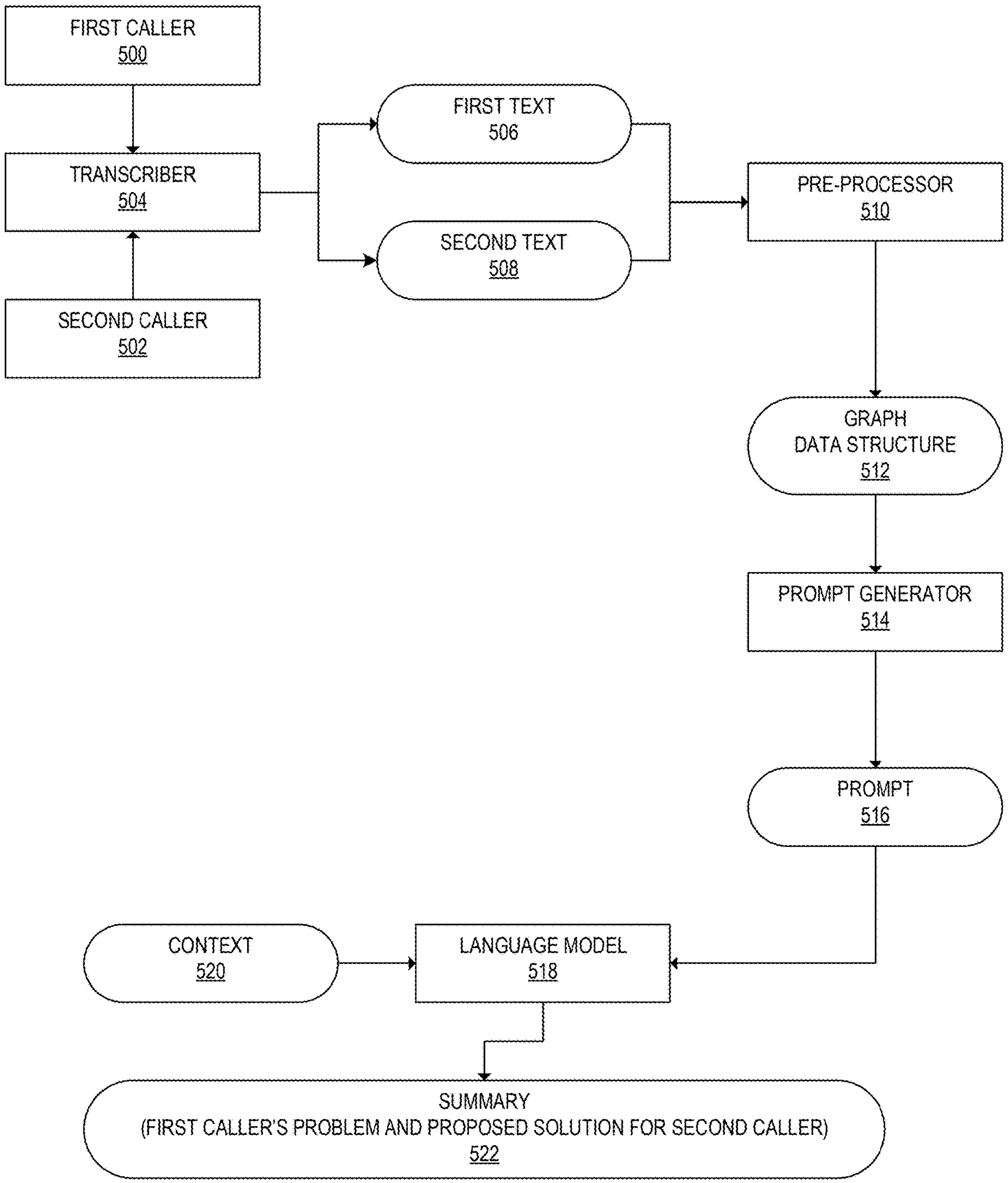

FIG. 3, FIG. 4, and FIG. 5 show data flows for example methods for processing user-specific queries with an enhanced language model, in accordance with one or more embodiments. The data flows shown in FIG. 3 through FIG. 5 are specific examples of the method of FIG. 2, but also show the programs that execute the relevant method steps. Thus, the data flows shown in FIG. 3 through FIG. 5 may be executed using the system shown in FIG. 1A.

Attention is first turned to FIG. 3. FIG. 3 shows an embodiment in which the enhanced language model is used to process a user-specific query to generate a product recommendation. In particular, tax data (300) is extracted by an extraction program (302). For example, a multimodal model may process text and images and output user data in the form of W-2 information, 1099 information, etc.

The extraction program (302) in the example is also programmed to convert the tax data (300) into the graph data structure (304). The graph data structure (304) includes data elements (a field termed "gross wages" and a value for the field of "gross wages") and relationships among the data elements (the fact that the indicated value is a number that describes the field "gross wages").

The graph data structure (304) is provided to, or is referenced by, a prompt generator (306). The prompt generator (306) generates the prompt (308), including a system message, a command to reference a context (312), and a command that instructs the language model (310) to generate an output. In the example, the output is a product recommendation (314), which in this case is a recommendation for a specific tax program version (from among many possible tax program versions) that will best process the tax data (300). Thus, the output of the language model (310) is the product recommendation (314).

FIG. 4 shows another embodiment in which the enhanced language model is used to process a user-specific query to generate an electronic message automatically based on text received in a chatbot. In the example, a first user device (400) and a second user device (402) are exchanging chat messages via a chatbot (404) or some other messaging service. The first user device (400) generates the first text (406). The second user device (402) generates the second text (408).

The first text (406) and the second text (408) are provided to a pre-processor (410). The pre-processor (410) separates the first text (406) and the second text (408) and establishes relationships between the text and the user devices. The pre-processor (410) also converts the text into a predefined schema that identifies the relationships. Thus, the resulting graph data structure (412) contains the first text (406), associated with the first user device (400), and the second text (408), associated with the second user device (402).

The graph data structure (412) is provided to a prompt generator (414). The prompt generator (414) generates a prompt (416), which includes the graph data structure (412), a command to reference a context (420), and a command to the language model (418) to generate an output. The output commanded, in the example, is the electronic message (422). The electronic message (422) may be a reminder scheduled based on one or both of the first text (406) and the second text (408). In this case, the first user device (400) and the second user device (402) discuss scheduling, and the electronic message (422) is an electronic message commanding a scheduling program to set a reminder, a schedule, etc. The electronic message (422) also may be an email or message to one or both of the first user device (400) and the second user device (402).

Attention is now turned to FIG. 5. FIG. 5 shows an embodiment in which the enhanced language model is used to process a user-specific query to both summarize a user's problem, and to propose a solution to the user's problem. In other words, FIG. 5 may be useful in implementing an automated help call center.

In the example, a first caller (500) is a user who has a problem with which the first caller (500) needs help. The second caller (502) is a technical expert associate that is trained to answer questions regarding a specific subject matter (e.g., tax questions). A transcriber (504) (a software program that automatically converts the voice to text) converts the utterances of the first caller (500) into the first text (506). The transcriber (504) also converts the utterances of the second text (508) into the second text (508).

The first text (506) and the second text (508) are provided to the pre-processor (510), which may be similar to the pre-processor (510) described with respect to FIG. 4. Namely, the pre-processor (510) separates the first text (506) and the second text (508) and establishes relationships between the text and the utterances of the two users. The pre-processor (510) also converts the text into a predefined schema that identifies the relationships. Thus, the resulting graph data structure (512) contains the first text (506), associated with the utterances of the first caller (500), and the second text (508), associated with the utterances of the second caller (502).

The graph data structure (512) is provided to a prompt generator (514). The prompt generator (514) generates a prompt (516), which includes the graph data structure (512), a command to reference a context (520), and a command to the language model (518) to generate an output. The output commanded, in the example, is the summary (522). The summary (522) may be a summary of the problem described by the first caller (500). The summary (522) also includes a proposed solution to the problem. The proposed solution of the summary (522) may be displayed to the second caller (502) on a user device accessible by the second caller (502). Thus, the second caller (502) may describe the proposed solution to the first caller (500).

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or micro-cores, of a processor. The computer processor(s) (602) includes one or more processors. The computer processor(s) (602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments.

The communication interface (608) may include an integrated circuit for connecting the computing system (600) to a network (not shown) (e.g., a local area network (LAN), a wide area network (WAN) such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many different types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

Figure 6B:
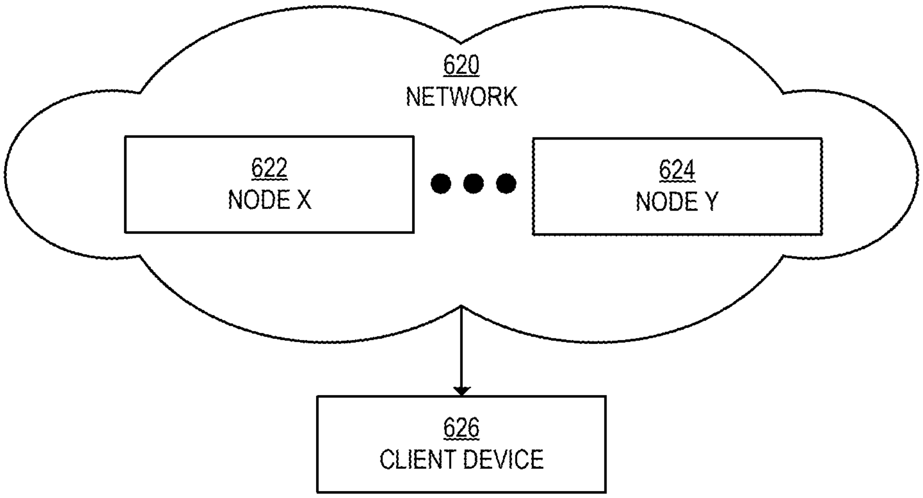

The computing system (600) in FIG. 6A may be connected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a computing system, such as the computing system shown in FIG. 6A. Further, the client device (626) may include or perform all or a portion of one or more embodiments.

The computing system of FIG. 6A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

receiving a user-specific query relating to a user;

extracting user data from a user-specific data source associated with the user and related to the user-specific query;

converting the user data into a graph data structure that defines, as edges, relationships between data elements contained in the user data, wherein the data elements comprise nodes of the graph data structure, wherein the nodes are connected by the edges, and wherein the graph data structure is stored in a data schema;

constructing a prompt for a language model, wherein constructing comprises:

adding, to the prompt, the graph data structure such that, when executed, the language model processes both the edges and the nodes in the graph data structure, adding, to the prompt, a first command to reference a context comprising context data stored in the data schema, wherein the context is at least partially related to the user-specific query, and wherein the data schema for the graph data structure and the data schema for the context data are a same data schema format, and adding, to the prompt, a second command to generate an output from the context, wherein the output is indirectly related to the user data;

executing the language model with the prompt to generate the output, wherein the language model is trained with the context; and returning the output.

2. The method of claim 1, wherein the language model is trained with the context.

3. The method of claim 1, wherein:

the user data comprises form data stored in an electronic form, the relationships comprise relationships between fields in the electronic form and entries in the electronic form, and wherein the relationships comprise edges of the graph data structure, the data elements comprise names of the fields and the entries in the fields, and wherein the data elements comprise nodes of the graph data structure, the context comprises related information related to the electronic form and additional information unrelated to the electronic form, the output comprises an object in the additional information pertinent to the user data, and returning the output comprises transmitting or displaying the output to a user of the user data.

4. The method of claim 3, further comprising:

receiving feedback from the user regarding the output;

updating a user profile of the user based on the feedback; and repeating converting, constructing, executing, and returning, wherein the user profile is added to the user data during repeating.

5. The method of claim 1, wherein extracting the user data comprises executing a multimodal machine learning model on one or more documents or images contained on the user data, and wherein a multimodal output of the multimodal machine learning model comprises the user data.

6. The method of claim 1, wherein returning the output comprises passing the output to an external program, and wherein the method further comprises processing the output by the external program.

7. The method of claim 1, wherein:

the user data comprises chatbot text comprising first text entered in a chatbot by a first user and second text entered in the chatbot by a second user, the data elements comprise the first text, the second text, and additional data relating to the first user, and wherein the data elements comprise nodes of the graph data structure, the relationships comprise relationships among the first text, the second text, and the additional data, and wherein the relationships comprise edges of the graph data structure, the context comprises related information related to the first user or the second user, and the output comprises an electronic message addressed to the first user.

8. The method of claim 7, further comprising:

transmitting the output to an application programming interface (API) of the chatbot; and communicating, via the API, the electronic message to messaging software; and transmitting the electronic message via the messaging software.

9. The method of claim 8, further comprising:

transmitting the electronic message to both the first user and the second user.

10. The method of claim 1, wherein:

the user data comprises first voice data from a first user and second voice data from a second user, converting the user data further comprises:

converting the first voice data into first text, converting the second voice data into second text, separating the first text from the second text and placing the first text and the second text into a structured format, the data elements comprise the first text in the structured format, the second text in the structured format, and additional data relating to the first user, and wherein the data elements comprise nodes of the graph data structure, the relationships comprise relationships among the first text, the second text, and the additional data, and wherein the relationships comprise edges of the graph data structure, the context comprises related information related to the first user or the second user, and the output comprises a summarized problem proposed by the first user and a proposed solution for presentation by the second user.

11. The method of claim 10, wherein converting further comprises:

identifying undesirable information in the first text and the second text; and removing the undesirable information prior to constructing the prompt.

12. The method of claim 10, wherein adding the graph data structure to the prompt comprises converting the graph data structure into a vector and adding the vector to the prompt.

13. A system comprising:

a computer processor;

a data repository in communication with the computer processor and storing:

a user-specific query relating to a user, user data from a user-specific data source associated with the user and related to the user-specific query, a graph data structure that defines, as edges, relationships between data elements contained in the user data, wherein the data elements comprise nodes of the graph data structure, wherein the nodes are connected by edges, and wherein the graph data structure is stored in a data schema, a prompt, a context comprising context data stored in the data schema, wherein the context is at least partially related to the user-specific query, and wherein the data schema for the graph data structure and the data schema for the context data are a same data schema format, and an output;

a language model executable by the computer processor, wherein the language model is trained with the context; and a server controller programmed, when executed by the computer processor, to perform a computer-implemented method comprising:

receiving the user-specific query, extracting the user data, converting the user data into the graph data structure, constructing the prompt, wherein constructing comprises:

adding, to the prompt, the graph data structure such that, when executed, the language model processes both the edges and the nodes in the graph data structure, adding, to the prompt, a first command to reference the context, and adding, to the prompt, a second command to generate the output from the context, wherein the output is indirectly related to the user data, and executing the language model with the prompt to generate the output.

14. The system of claim 13, wherein the language model comprises:

an input layer programmed to process the user data in the data schema, a feature extraction layer programmed to extract a feature from the user data and prepare the feature for further processing, a retrieval layer programmed to retrieve data from the graph data structure, and a classifier layer comprising a neural network programmed to categorize the feature and the user data and to predict, from the feature and the user data, the output.

15. The system of claim 13, further comprising:

a communication interface in communication with the computer processor and programmed to communicate with a user device.

16. The system of claim 13, wherein the server controller is further programmed to return the output to the data repository, and wherein the system further comprises:

a training controller executable by the computer processor to retrain the language model using the output.

17. The system of claim 13, wherein:

the user data comprises form data stored in an electronic form, the relationships comprise relationships between fields in the electronic form and entries in the electronic form, and wherein the relationships comprise edges of the graph data structure, the data elements comprise names of the fields and the entries in the fields, and wherein the data elements comprise nodes of the graph data structure, the context comprises related information related to the electronic form and additional information unrelated to the electronic form, the output comprises an object in the additional information pertinent to the user data, and returning the output by transmitting or displaying the output to a user of the user data.

18. The system of claim 13, wherein:

the user data comprises chatbot text comprising first text entered in a chatbot by a first user and second text entered in the chatbot by a second user, the data elements comprise the first text, the second text, and additional data relating to the first user, and wherein the data elements comprise nodes of the graph data structure, the relationships comprise relationships among the first text, the second text, and the additional data, and wherein the relationships comprise edges of the graph data structure, the context comprises related information related to the first user or the second user, and the output comprises an electronic message addressed to the first user.

19. The system of claim 13, wherein:

the user data comprises first voice data from a first user and second voice data from a second user, converting the user data further comprises:

converting the first voice data into first text, converting the second voice data into second text, separating the first text from the second text and placing the first text and the second text into a structured format, the data elements comprise the first text in the structured format, the second text in the structured format, and additional data relating to the first user, and wherein the data elements comprise nodes of the graph data structure, the relationships comprise relationships among the first text, the second text, and the additional data, and wherein the relationships comprise edges of the graph data structure, the context comprises related information related to the first user or the second user, and the output comprises a summarized problem proposed by the first user and a proposed solution for presentation by the second user.

20. A method of training a language model, the method comprising:

extracting user data relating to a user from a user-specific data source associated with the user and related to a user-specific query;

converting the user data into a graph data structure that defines, as edges, relationships between data elements contained in the user data, wherein the data elements comprise nodes of the graph data structure, wherein the nodes are connected by the edges, and wherein the graph data structure is stored in a data schema;

constructing a prompt for the language model, wherein constructing comprises:

adding, to the prompt, the graph data structure such that, when executed, the language model processes both the edges and the nodes in the graph data structure, adding, to the prompt, a first command to reference a context comprising context data stored in the data schema, wherein the context is at least partially related to the user-specific query, and wherein the data schema for the graph data structure and the data schema for the context data are a same data schema format, and adding, to the prompt, a second command to generate an output from the context, wherein the output is indirectly related to the user data;

executing the language model with the prompt to generate the output, wherein the language model is trained with the context;

returning the output to a data repository also storing training data; and retraining the language model on the output and the training data.

* * * * *